Patented Oct. 31, 1944

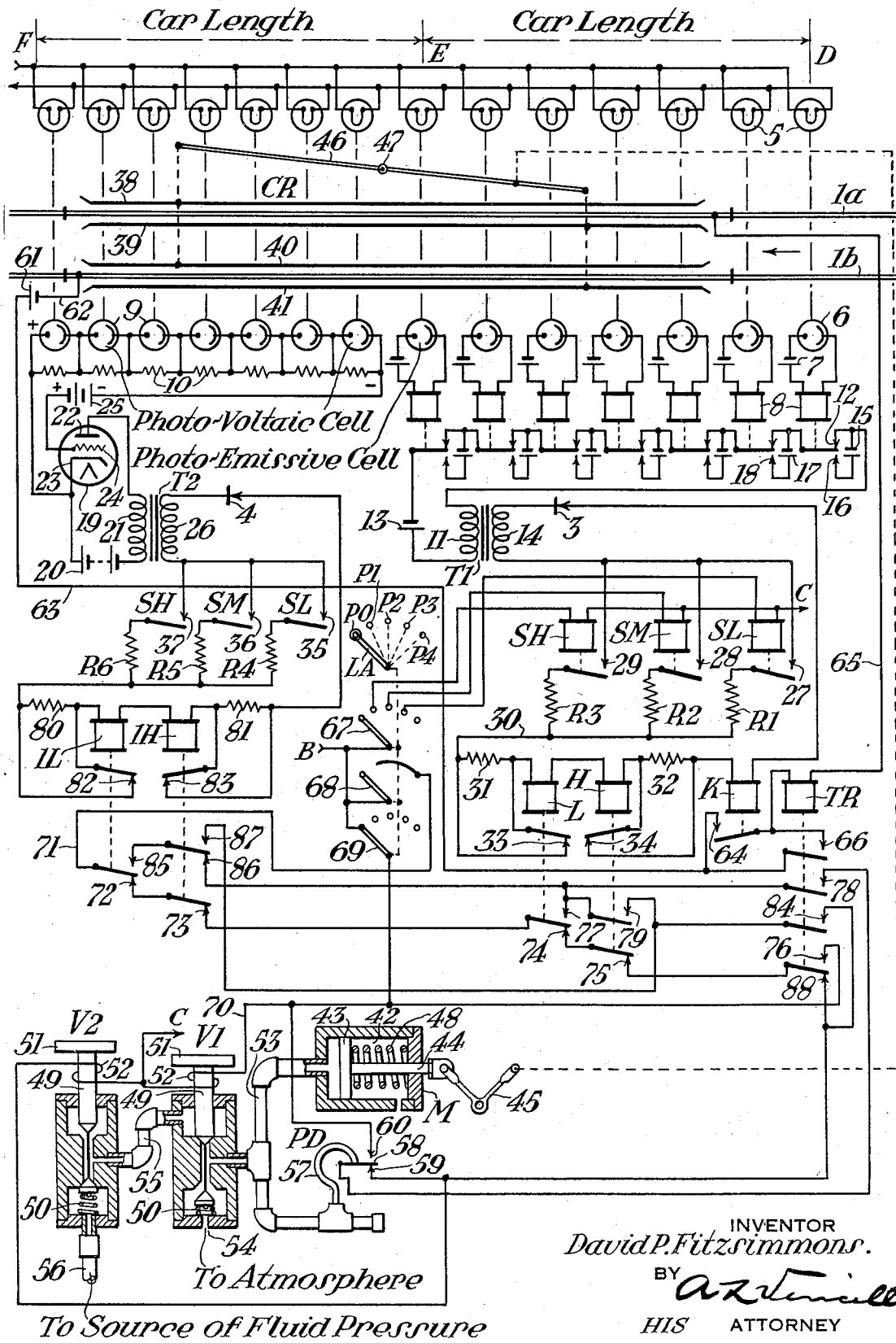

2,361,466

UNITED STATES PATENT OFFICE 2,361,466

TRAFFIC SPEED MEASURING AND CONTROLLING APPARATUS

David P. Fitzsimmons, Trafford, Pa., assignor to The Union Switch & Signal Company, Swissvale, Pa., a corporation of Pennsylvania Application May 29, 1943, Serial No. 489,078

14 Claims. (Cl. 104—26)

My invention relates to traffic speed measuring and controlling apparatus, and more particularly to apparatus for measuring the speed of a car or vehicle moving along a traffic path and for controlling signaling means or car braking means according to the measured speed.

A feature of my invention is the provision of novel and improved means located along a traffic path for measuring the speed of a car or vehicle traversing such traffic path.

Another feature of my invention is the provision of improved apparatus located along a traffic path for automatically controlling a car according to the speed at which the car traverses a given section of such path.

Other features, objects and advantages of my invention will appear as the specification progresses.

According to my invention, a section of a traffic path traversed by cars and vehicles is provided with means to supply direct current and a transformer having a magnetizable core. A first winding of the transformer is connected to the supply means to create a normal value of magnetic flux in the transformer core. The transformer and current supply means are controllably associated with the section to vary the magnetic flux in response to a car traversing the section, such variation of the magnetic flux being at a rate directly proportional to the speed of the car. The transformer is provided with a second winding in which there is created an electromotive force in response to such variation of the magnetic flux, the magnitude of the electromotive force being proportioned to the rate at which the flux is varied, and hence being a measure of the speed of the car. Electroresponsive means is connected to the second winding of the transformer to receive energy therefrom, and is controlled to different positions according to the magnitude of the electromotive force. Preferably a plurality of car governed or car detecting devices are disposed along the section, one at each of a plurality of preselected points. Each of these devices responds to the passing of a car to cause a predetermined change in the value of the direct current supplied by said supply means to the first winding of the transformer, to cause, in turn, a corresponding change in the magnetic flux of the transformer core. The spacing of these detecting devices and the change effected by each device in the value of the direct current flowing in the first winding of the transformer are preselected so that any car passing along the section of the traffic path to successively pass the detecting devices causes the direct current to change at a rate that is directly proportional to the speed of the car. The transformer is proportioned to avoid saturation of its magnetic core and hence it follows that the magnitude of the electromotive force induced in the second winding of the transformer is a direct measure of the speed of the car. Preferably the electroresponsive means connected to the second transformer winding include a plurality of control relays having different operating characteristics so that these relays are energized to different conditions according to the magnitude of the electromotive force. Such control relays are used in turn to control signaling means, car braking means or other apparatus as desired.

I shall describe one form of apparatus embodying my invention, and shall then point out the novel features thereof in claims.

The accompanying drawing is a diagrammatic view showing one form of apparatus embodying my invention when used with railway car retarders. It is to be understood, however, that my invention is not limited to car retarders, and this one form of the apparatus serves to illustrate the principle of the invention and the many places where apparatus embodying the invention is useful.

Referring to the drawing, the reference characters 1a and 1b designate the rails of a railway track over which cars normally move in the direction indicated by an arrow. In the form of the apparatus here used to illustrate my invention, this railway track may be in a classification yard of the hump type and over which track the cars move under the influence of gravity. It is obvious that under such circumstances the speed of individual cars or cuts of cars will vary depending, among other things, on the speed at which they leave the hump, the temperature, the weight of a car and its contents, and the condition of the car itself. In such classification yard, it is desirable that a car leaves the retarder at a speed preselected by the operator according to the distance the car is to move in being classified, the weight of the car and other conditions. This railway track of the drawing is formed with one or more sections, each of defined limits, two such sections D—E and E—F being shown. Each such section is indicated as being of one car length, that is, the length of a section is of the order of say, for example, thirty feet. It is to be understood that these sections may be of other lengths and that only one section may be used or more than two sections may be used. Each section of the track is provided with a series of devices for detecting the passing of a car through the section. These devices may be any one of several different arrangements. Referring to section D—E, a series of light responsive devices are spaced at preselected points along the section, seven devices spaced at substantially equal intervals being shown, although a greater or a lesser number and an unequal spacing may be used. Each of these devices comprises a lamp 5 disposed on one side of the track to direct its light beam across the track to a photoemissive cell 6, cell 6 becoming conductive in response to such light beam to permit current to flow from a battery 7 to a relay 8 for energizing and picking up that relay. The arrangement is such that the light beam is of a height above the track so as to be intercepted by a car, the intercepting of the light beam causing the associated photo cell 6 to become nonconducting and the respective relay 8 to become deenergized.

Similarly, section E—F is provided with a series of light responsive devices spaced at substantially equal intervals. Each device for section E—F includes a photovoltaic cell 9 which produces an electromotive force in response to the light beam from the associated lamp 5 to cause current to flow in a resistor 10 connected across the terminals of the photocell. Thus there is produced a voltage drop across each resistor 10 which is substantially equal to the electromotive force created by the respective photocell. The seven units each including a photocell and a resistor are arranged in series and hence when section E—F is unoccupied and each cell is illuminated by its respective light, a resultant electromotive force equal to substantially the summation of the seven individual electromotive forces is created across the group of units.

A control circuit including a transformer is provided for each section D—E and E—F, each such circuit being governed by each detecting device of the associated section. The control circuit for section D—E normally includes a first or primary winding 11 of a transformer T1, a front contact 12 of each of the relays 8 of the detecting devices for section D—E, and a battery 13. It is clear that this circuit is supplied with direct current from battery 13 when section D—E is unoccupied, the value of the direct current being preselected by the resistance of the circuit and the voltage of battery 13. Transformer T1 is provided with a second or secondary winding 14 but normally no electromotive force is induced in the secondary winding 14 since the direct current flowing in the primary winding 11 is of unvarying normal value. The direct current flowing in the control circuit is varied, however, when a car traverses the section D—E to successively interrupt the light beams of the several detecting devices. For example, when the car intercepts the light beam of the first device to the right as viewed in the drawing and deenergizes the respective relay 8, a battery 15 is interposed in the control circuit through back contact 16 of the respective relay 8. Battery 15 is poled to serially aid battery 13, and the value of the direct current flowing in the control circuit is increased, the amount of such increase being predetermined by the proportioning of the different parts of the circuit. When the car advances to intercept the light beam of the next detecting device to the left, a battery 17 is interposed in the control circuit through back contact 18 of the relay 8 of the second device. Battery 17 is similar to battery 15 and is poled to aid so that the control circuit now includes the three batteries 13, 15 and 17, and the direct current is again increased by an amount equal to that caused when battery 15 was interposed into the circuit. In a similar manner each relay of the several detecting devices when deenergized due to the car passing the respective location interposes a battery in the control circuit to cause the direct current to be increased, the amount of increase being substantially the same each time. It follows that a car traversing section D—E to successively intercept the light beams of the different detecting devices will cause the direct current flowing in the control circuit to be progressively increased and the rate of such increase will be in direct proportion to the speed of the car. Such variation of the direct current flowing in the primary winding 11 of transformer T1, causes a corresponding variation in the flux of the core of the transformer and induces an electromotive force in secondary winding 14, the magnitude of such electromotive force being determined by the rate at which the direct current is varied in the primary winding. Consequently by proper spacing of the detecting devices and proper proportioning of the transformer and current sources of the control circuit, secondary winding 14 inductively receives an electromotive force of a given polarity and the magnitude of which is a measure of the speed of the car passing through the section D—E. It is to be pointed out that transformer T1 is proportioned with a magnetic core structure that does not reach saturation when a car occupies the section D—E to intercept all of the light beams and a maximum value of direct current is supplied to the control circuit. Furthermore, battery 13 which is normally included in this control circuit may not be needed. That is, the normal value of the current flowing in the control circuit may be zero.

The control circuit associated with section E—F includes a transformer T2 and preferably an amplifier tube 19. The type of amplifier tube is immaterial and tube 19 is an indirectly heated tube having a plate circuit including a battery 20, primary winding 21 of transformer T2, plate 22 and intervening tube space to cathode 23 of tube 19. The grid circuit of tube 19 comprises control grid 24, biasing battery 25, the group of photocells 9 and associated resistors 10 in multiple and cathode 23 of tube 19. Biasing battery 25 is poled as indicated by the plus and minus signs placed in the drawing to oppose the electromotive force created by the cells 9, the arrangement being that a small resultant positive grid voltage is normally effected by battery 25. Thus when section E—F is unoccupied and all the photocells 9 are effective to create an electromotive force, a small normal positive grid bias voltage is provided for tube 19 and a predetermined value of plate current flows. Transformer T2 is provided with a secondary winding 26, but no electromotive force is normally induced in this secondary winding due to the unvarying value of the plate current for tube 19 flowing in the primary winding 21 of transformer T2.

The grid bias voltage of tube 19 is varied by the detecting devices when a car passes through section E—F. The car upon entering section E—F at the right to intercept the light beam of the first photocell 9, causes this cell to become ineffective to create its electromotive force and a corresponding change in the bias voltage of tube 19 takes place. With the first cell 9 ineffective then the electromotive force of the six remaining cells is applied to the grid circuit through the resistor 10 of the cell that is ineffective and thus the grid bias voltage is driven in the positive direction by an amount substantially equal to the electromotive force created by the cell 9 that is now ineffective, and the plate current for tube 19 is correspondingly increased. The car advancing to intercept the light beam of the second cell 9 and each successive cell, causes similar actions. Consequently the plate circuit current is increased progressively in response to a car traversing section E—F, the plate circuit increasing to a maximum value when the car occupies the section to intercept all of the light beams. The rate of such increase of the plate current is directly proportional to the speed of the car, and hence secondary winding 26 of transformer T2 inductively receives an electromotive force the magnitude of which is a measure of the speed of the car passing through the section.

The electromotive force induced in secondary winding 14 of transformer T1 associated with section D—E and the electromotive force induced in secondary winding 26 of transformer T2 associated with section E—F are used in each case to control a group of relays which are energized to different positions according to the magnitude of the respective electromotive force. Three relays L, H and K are serially connected to secondary winding 14 of transformer T1 through three alternative circuit paths, each of which paths includes a resistor of a preselected resistance. To be explicit, a circuit can be traced from the lower terminal of secondary winding 14 through either a first path including front contact 27 of a relay SL and resistor R1 to wire 30, or a second path including front contact 28 of a relay SM and resistor R2 to wire 30, or a third path including front contact 29 of a relay SH and resistor R3 to wire 30, thence through resistor 31, winding of relay L, winding of relay H, resistor 32, winding of relay K and a rectifier 3 in its low resistance direction to the top terminal of secondary winding 14. Resistor 31 is by-passed by a connection including back contact 33 of relay L and resistor 32 is by-passed by a connection including back contact 34 of relay H for reasons to appear hereinafter. Rectifier 3 is poled to pass an electromotive force induced in secondary winding 14 in response to an increase in the direct current supplied to primary winding 11 and to block the electromotive force induced in secondary winding 14 due to a decrease in the direct current supplied to primary winding 11. Relays L and H are adjusted for different preselected pick-up electromotive forces, that for relay L being relatively low and that for relay H being relatively high. Relay K is adjusted with a pick-up electromotive force somewhat lower than that provided for relay L. Resistors R1, R2 and R3 are made of different resistances, resistor R1 being of a preselected low value, resistor R2 being of a preselected medium value, and resistor R3 being of a preselected high value. Thus when relay SL is energized in a manner to be explained hereinafter, and resistor R1 of preselected low value is interposed in the circuit connection of relays L, H and K to secondary 14, an electromotive force of a first value picks up relays L and K but not relay H, and an electromotive force of a second and higher value picks up relay H along with relays L and K. Selection of relay SM to interpose resistor R2 of the medium value in the second connection of the relays to secondary winding 14 requires that the electromotive force of secondary winding 14 be of a third value that is somewhat higher than the previously stated second value in order to pick up the relay L and for the electromotive force to be of a fourth and still higher value to pick up relay H along with relay L. Similarly, selection of relay SH to interpose resistor R3 of the high value in the circuit connection requires the electromotive force of secondary winding 14 to be of a higher fifth value in order to pick up relay L and to be of a sixth value to pick up relay H along with relay L.

This selective control of relays L, H and K can be clarified by way of illustration by saying that with relay SL selected to interpose resistor R1 in the circuit connection, an electromotive force of say four volts is required to pick up relay L and of five volts to pick up relay H along with relay L, selection of relay SM to interpose resistor R2 in the circuit connection makes it necessary that the electromotive force be of six volts to pick up relay L and of seven volts to pick up relay H along with relay L, and selection of relay SH to interpose resistor R3 in the circuit connection makes it necessary for the electromotive force to be of eight volts to pick up relay L and to be of nine volts to pick up relay H along with relay L. Relay K whose pick-up electromotive force is relatively low would be picked up under all conditions. With relay L picked up to open back contact 33, the resistor 31 is interposed in the circuit and the current flow is reduced so that relay L is made to release at substantially the same value of electromotive force of secondary winding 14 as that required to pick up the relay L. Likewise, relay H on picking up to open its back contact 34 causes resistor 32 to be interposed in the circuit and relay H releases at substantially the same value of electromotive force as required to pick up the relay H.

Similarly, two relays 1L and 1H are connected to secondary winding 26 of transformer T2 through a circuit connection comprising three alternative paths, one of which includes front contact 35 of relay SL and a resistor R4, a second one of which includes front contact 36 of relay SM and a resistor R5, and a third one of which includes front contact 37 of relay SH and a resistor R6. Relay 1L is adjusted for a relatively low pick-up electromotive force and relay 1H is adjusted for a relatively high pick-up electromotive force and resistors R4, R5 and R6 are made of a preselected low, medium and high value. Consequently, selection of relay SL to interpose resistor R4 in the circuit connection establishes a first value of electromotive force of secondary winding 26 to pick up relay 1L, and an electromotive force of a second value to pick up relay 1H, selection of relay SM to interpose resistor R5 in the connection establishes a third value of electromotive force to pick up relay 1L and a fourth value of electromotive force to pick up relay 1H, and selection of relay SH to interpose resistor R6 in the connection establishes a fifth and a sixth value of electromotive force to pick up relays 1L and 1H, respectively. To resistors 80 and 81 are serially included in the circuit connection of relays 1L and 1H to secondary winding 26 and are shunted through back contacts 82 and 83 of relays 1L and 1H, respectively, to cause relays 1L and 1H to release at near the same electromotive force of secondary winding 26 as that at which they pick up. A rectifier 4 is also included in the circuit connection of relays IL and IH to secondary winding 26, and poled to pass the electromotive force induced in secondary winding 26 due to an increase in the current flowing in primary winding 21 and to block the electromotive force induced in secondary winding 26 due to a decrease in the direct current flowing in primary winding 21.

The control relays L, H, IL and IH are used to control the speed of a car traveling sections D—E and E—F through the medium of a car retarder CR. Car retarder CR may be of different forms and is shown as comprising two braking bars 38 and 39 extending parallel with, and located on opposite sides of rail 1a, and two similar braking bars 40 and 41 extending parallel with, and located on opposite sides of rail 1b. The length of these braking bars of the retarder CR would be preselected to suit the location of the retarder in the classification yard and might be less than a car length or might be several car lengths. In the present application the bars of retarder CR are shown as being of a length greater than one car but less than two cars, and are disposed so that they extend along a portion of section D—E and a portion of section E—F, the entering end of section D—E being in the rear of the entering end of the car retarder, and the leaving end of section E—F being in advance of the leaving end of the retarder. It is to be understood that the particular arrangement of the sections and retarder is immaterial and such arrangement would be preselected to suit the particular location.

The braking bars of the retarder are operated by a fluid pressure motor M comprising a cylinder 42 containing a piston 43 attached to one end of a piston rod 44. The braking bars are operably connected to the piston rod 44 through a suitable drive mechanism including a bell crank 45 and a lever 46 pivotally mounted at point 47. Piston 43 is biased to its left-hand position, that is, the position shown in the drawing, by a spring 48, and at this left-hand position the braking bars occupy their non-braking positions in which they are out of engagement with the wheels of a car traveling on the rails 1a and 1b. When piston 43 is moved to a right-hand position, as when fluid pressure is admitted to the left-hand end of cylinder 42, the braking bars are moved toward the associated rails to a braking position in which they engage the wheels of a car traversing the rails to retard the speed of the car.

Motor M is controlled by two magnet valves V1 and V2, each comprising a valve stem 49 biased to its upper position by means of a spring 50, an armature 51 and a winding 52. When valve V1 is energized, as shown in the drawing, its valve stem 49 is pulled downwardly against the bias of its spring 50, and a pipe 53 which communicates with the left-hand end of the motor cylinder 42 is connected with atmosphere through a port 54. When valve V1 is deenergized, pipe 53 is disconnected from atmosphere and is connected to a pipe 55 leading to valve V2. When valve V2 is energized, its valve stem 49 is pulled downwardly and connects pipe 55 with pipe 56 which is constantly supplied with fluid pressure, such as air, from a source not shown. When valve V2 is deenergized, as shown in the drawing, pipe 55 is disconnected from pipe 56. It will be apparent therefore that when valve V1 is energized, the region of cylinder 42 of motor M between piston 43 and the left-hand end of the cylinder is connected to atmosphere and the braking bars of the car retarder are moved to the non-braking position by spring 48. When, however, valve V1 is deenergized and valve V2 is energized, fluid pressure is supplied to the left-hand end of cylinder 42 thus causing the braking bars of the retarder to be moved to their braking positions, the bars exerting a braking force which is proportional to the pressure of the fluid which is supplied to motor M and which pressure may be assumed to be of the order of 100 pounds per square inch when the full pressure of the source of supply is used.

The valves V1 and V2 are controlled in part by a pressure responsive device PD which may be any one of several different forms and here includes a Bourdon tube 57 connected to pipe 53 and hence subjected to the pressure of the fluid supplied to motor M. Tube 57 controls a contact member 58, the arrangement being such that with atmospheric pressure in pipe 53 contact member 58 is forced downwardly to engage a contact 59, but that with a pressure of, say, for example, 45 pounds per square inch in pipe 53, the tube 57 is extended and contact member 58 moves out of engagement with contact 59. At some higher pressure, say, for example, 55 pounds per square inch, tube 57 is extended sufficient to move contact member 58 to engage a contact 60.

These valves V1 and V2 are also controlled in part by a manually operable lever LA, which is capable of assuming five positions P0, P1, P2, P3 and P4. Operatively connected to lever LA are contact members 67, 68 and 69 which are used to make circuit connections at the different positions of the lever as will appear when the operation of the apparatus is described, certain ones of the circuit connections being used to control valves V1 and V2.

Valves V1 and V2 are further controlled by relays L and H associated with section D—E, relays IL and IA associated with section E—F and by a track relay TR responsive to a car in the retarder.

Track relay TR is controlled by a track circuit which is preferably of the open circuit type and includes a battery 61, one terminal of battery 61 being connected to rail 1a through wire 63, front contact 64 of relay K, winding of relay TR and wire 65. To form this track circuit the rails 1a and 1b are provided with the usual insulated rail joints which are disposed in the rails so as to make the track circuit substantially the same length as the braking bars of the retarder. The front contact 64 of relay K is shunted by front contact 66 of the track relay TR. Thus with relay K picked up closing front contact 64 and the leading pair of wheels of a car enters the track circuit, relay TR is energized and picked up and relay TR is subsequently retained energized through its stick contact 66 as long as any pair of wheels of this car or any pair of wheels of a car coupled to this car occupies the track circuit.

In describing the operation of the apparatus, I shall assume that the apparatus occupies its normal position, that is, the position shown in the drawing, and in which position no car is moving through either section D—E or E—F, lever LA is set at its P0 position and all the lamps of the different detecting devices are illuminated. At the position P0 of lever LA, a circuit is formed from terminal B of a suitable source of current, such as a battery now shown, through lever contact member 69, wire 70 and winding 52 of valve V1 to terminal C of the same source, and valve V1 is energized to connect the motor cylinder 42 to atmosphere so that the braking bars of retarder CR occupy their non-braking position.

I shall next assume a car is moving toward the retarder and the operator wishes to have this car leave the retarder at the highest speed for which the apparatus is designed, and to this end the operator moves lever LA to its position P1. At position P1 the formerly traced circuit for valve V1 is opened at lever contact 69 and valve V1 is deenergized to blank port 54 and to connect pipe 53 to valve V2. Movement of lever LA to position P1 moves contact member 67 to complete a simple circuit for relay SH, and relay SH is picked up to interpose resistor R3 in the circuit connection of relays L and H to secondary winding 14 of transformer T1, and to interpose resistor R6 in the circuit connection of relays 1L and 1H to secondary winding 26 of transformer T2. This car in approaching the retarder would enter section D—E a little before reaching the entrance end of the retarder, and hence would intercept the light beams of certain ones of the detecting devices associated with section D—E prior to entering the retarder. Interception of the light beams of these detecting devices causes an electromotive force to be induced in secondary winding 14 in the manner explained hereinbefore, and the magnitude of which electromotive force is a measure of the speed of the car. Relay K is picked up in response to this electromotive force, due to its relatively low pick-up electromotive force and on picking up to close its front contact 64 prepares the track circuit so that when the leading pair of wheels enters the track circuit the track relay TR is energized and picked up. I shall first consider that this car is moving at a speed somewhat less than the high speed preselected by the operator for this car to leave the retarder. The resistor R3 is so proportioned that the electromotive force created in secondary winding 14 when the car is moving at a speed less than the preselected high speed is not sufficient to energize either relay L or H and these relays remain released. Under these circumstances, a circuit is formed and current flows from terminal B through lever contact 68, wire 71, back contacts 72, 73, 74 and 75 of relays 1L, 1H, L and H, respectively, front contact 76 of track relay TR, wire 70 and winding 52 of valve V1 to terminal C, and valve V1 is energized to cause the retarder to be retained at its non-braking position, and the car is permitted to move through section D—E unimpeded because its speed is already less than the preselected speed at which it may leave the retarder.

Likewise, resistor R6 is proportioned so that the electromotive force induced in secondary winding 26 due to this car moving through section E—F at a speed less than the preselected high speed is less than that required to pick up either relay 1L or 1H, and these relays remain released and the retarder is held at its non-braking position, so as not to impede this car. It is to be observed that when the rear of the car passes beyond the light beams of the different detecting devices of section D—E, and the respective relays 8 are reenergized and the different batteries 15, 17, etc. are removed from the control circuit, the direct current decreasing in value and such decrease of direct current induces an electromotive force in secondary winding 14, but this electromotive force is of a polarity that is blocked by rectifier 3. In like fashion, rectifier 4 blocks the electromotive force created in winding 26 due to the rear of the car passing beyond the light beam of the different devices of section E—F.

I shall next consider that the car approaches the retarder at some speed higher by a first amount than the preselected high speed. The electromotive force created in secondary winding 14 is then sufficient to pick up relay L but not relay H, and current flows from terminal B through lever contact 68, back contacts 72 and 73 of relays 1L and 1H, respectively, front contact 77 of relay L, front contact 78 of relay TR, contact 58—59 of pressure device PD and winding 52 of valve V2 to terminal C, and valve V2 is energized to admit pressure to the cylinder of motor M. However, when the pressure builds up to 45 pounds per square inch, the pressure device PD moves to open contact 58—59 and valve V2 is deenergized to shut off the pressure supply, the braking effort of the retarder being that derived from a pressure of 45 pounds per square inch at motor M. It is to be observed that if the pressure in the cylinder of motor M is increased due to the pair of wheels engaging the braking bars and forcing piston 43 to the left and the pressure in pipe 53 builds up to a pressure of 55 pounds per square inch, the pressure device PD moves to close contact 58—60 and current flows to valve V1 to energize that valve and open port 54 so that the pressure of cylinder 42 is again reduced to a pressure of 45 pounds per square inch. If this car continues through the retarder, or at least that portion of the retarder adjacent section D—E, at a speed somewhat above the preselected high speed and enters section E—F at a speed above the preselected high speed, the electromotive force created in secondary winding 26 of transformer T2 is sufficient to pick up relay 1L but not relay 1H, and current flows from terminal B through lever contact 68, wire 71, front contact 85 of relay 1L, back contact 86 of relay 1H, front contact 78 of relay TR, contact 58—59 of device PD and winding 52 of valve V2 to terminal C, and pressure of 45 pounds per square inch is still retained at motor M to provide a corresponding braking effort of the retarder.

Next consider that the car approaches the retarder at a speed considerably higher than the preselected high speed, the electromotive force induced in secondary winding 14 is of a magnitude sufficient to energize relay H along with relay L and current flows from terminal B through lever contact 68, wire 71, back contacts 72 and 73 of relays 1L and 1H, respectively, front contact 77 of relay L, front contact 78 of relay H, front contact 84 of relay TR and winding 52 of valve V2 to terminal C, and valve V2 is energized to supply pressure to motor M, the pressure building up in cylinder 42 of the motor to the full pressure of 100 pounds of the supply source and the retarder being moved to exert a corresponding braking effort on this car. If this car continues through the retarder to enter section E—F at the relatively high speed then the electromotive force of secondary winding 26 of transformer T2 is sufficient to pick up relay 1H along with relay 1L and current flows from terminal B through lever contact 68, wire 71, front contacts 85, 87 and 84 of relays 1L, 1H and TR, respectively, and winding 52 of valve V2 to terminal C and valve V2 is still energized to retain the full braking effort of the retarder by supplying pressure of 100 pounds to the motor M.

If the speed of the car should decrease after it enters section D—E to a value that is only a little higher than the preselected high speed, the electromotive force of secondary winding 14 becomes only sufficient to energize relay L and not relay H, and relay H is released and the circuit for valve V2 is opened and that for valve V1 is closed and valve V1 is energized to connect motor M to atmosphere until the pressure at motor M is reduced to 45 pounds per square inch, and pressure device PD opens contact 58—60 and closes contact 58—59. If the retardation of the car is sufficient to bring the speed down to the preselected high speed, the electromotive force of secondary winding 14 is then insufficient to retain relay L energized and relay L releases to connect valve V1 in the circuit and that valve is energized and the retarder is operated to its non-braking position.

Conversely, a car entering the retarder at a speed below the preselected high speed and the braking bars are held at the non braking position and the car speed increases to a value higher than the preselected high speed, the electromotive force of secondary winding 14 is then sufficient to pick up relay L and bring about energization of valve V2 to supply a pressure of 45 pounds to the motor M and operate the retarder to exert its corresponding braking effort. If the car speed increases to a considerably higher value than the preselected high speed, then the electromotive force of winding 14 becomes sufficient to pick up relay H and valve V2 is energized to cause pressure of 100 pounds to be supplied to motor M so that the retarder is operated to exert its full braking effort. A corresponding automatic operation occurs where the car is moving through section E—F. In other words, the apparatus continuously measures the speed of the car as it passes through the retarder and operates the retarder to different braking positions corresponding to the speed.

In case the circumstances are such that the operator wishes to have a car that is approaching the retarder leave the retarder at a preselected medium speed for which the apparatus is designed, he moves lever LA to position P2 where contact member 67 completes a simple circuit for relay SM, and that relay is energized to interpose resistor R2 in the circuit connection of relays L and H to secondary winding 14 and to interpose resistor R5 in the circuit connection of relays IL and IH to secondary winding 26. The operation of the apparatus in response to this car for which the medium speed is selected is similar to that for the car for which a high speed was selected, except for the fact that resistors R2 and R5 are proportioned for different values of the electromotive force for picking up relays L and H, and IL and IH, such values of electromotive forces bearing the same relation to the medium speed as the electromotive forces effected when resistors R3 and R6 are interposed in the circuit bear to the high speed, and a description of the operation of the apparatus for this car that is to leave the retarder at the medium speed will be readily understood by an inspection of the drawing taken in connection with the description of the operation of the apparatus for the car that was to leave the retarder at the high speed.

If the circumstances are such that the operator wishes to have a car that is approaching the retarder leave the retarder at the preselected low speed, then the lever LA is moved to position P3 where contact member 67 completes a circuit for relay SL and that relay is picked up to interpose resistors R1 and R4 in the respective circuit connections. Resistors R1 and R4 are each proportioned to require electromotive forces at the respective secondary windings for picking up the corresponding relays L, H, IL and IH that have a relationship to the preselected low speed as the electromotive forces in the former cases had to the preselected high speed or the preselected medium speed.

Section E—F is made to extend somewhat in advance of the retarder so that the speed of the car is measured until the rear wheels of the car leave the retarder. When the rear wheels of the car moving through the retarder vacates the track section, track relay TR is deenergized and releases to open the control circuit for valves V1 and V2 and the apparatus is restored to its normal condition, it being assumed of course that the operator moves lever LA back to its P0 position.

In case the circumstances are such that the operator wishes to control the retarder to its braking condition independent of the speed responsive apparatus, lever LA is moved to position P4 where contact member 68 completes a circuit through back contacts 72, 73, 74, 75 and 88 of relays IL, IH, L, H and TR, respectively, and winding 52 of valve V2 so that valve V2 is energized and air pressure supplied to motor M to move the retarder to its braking position.

Although the speed measuring apparatus is used to govern a car retarder, it is apparent that such apparatus can equally as well be used to govern signaling means, such as a railway signal or a highway crossing signal. It is also apparent that the individual car detecting devices can be track treadles or a track circuit using the rails in series so that the impedance in the rails progressively decreases as the car moves from the entrance end to the exit end of the track circuit.

Apparatus of the form here disclosed has the advantages that the speed of a car is automatically measured at all points along the section.

Although I have herein shown and described but one form of traffic speed measuring and controlling apparatus embodying my invention, it is understood that various changes and modifications may be made therein within the scope of the appended claims without departing from the spirit and scope of my invention.

Having thus described my invention, what I claim is:

1. In combination, a section of a traffic path traversed by cars, a transformer, direct current supply means, circuit means to connect said supply means to a first winding of said transformer to supply direct current thereto, said circuit means controllably associated with said section to vary the direct current thus supplied to said first winding at a rate directly proportional to the speed at which a car traverses the section, said transformer provided with a second winding to inductively receive an electromotive force in response to such variation of the direct current supplied to said first winding to measure by the magnitude of the electromotive force the speed of the car, and electroresponsive means receiving energy from said second winding controlled to different conditions according to the magnitude of said electromotive force.

2. In combination, a section of a traffic path traversed by cars, a transformer having a magnetizable core, direct current supply means connected to a first winding of said transformer to energize that winding to create a predetermined value of magnetic flux in said core, means controllably associated with said section to govern said supply means to vary the flux thus created in said core at a rate directly proportional to the speed of a car traversing said section, said transformer provided with a second winding to inductively receive an electromotive force in response to such variation of the flux created in said core to measure by the magnitude of the electromotive force the speed of the car, and electroresponsive means receiving energy from said second winding controlled to different conditions according to the magnitude of said electromotive force.

3. In combination, a section of a traffic path traversed by cars, a transformer, means to supply direct current, circuit means controllably associated with said section to connect said supply means to a first winding of said transformer to excite that winding with direct current the value of which varies at a rate directly proportional to the speed at which a car travels said section, said transformer having a second winding to receive an electromotive force due to such variation of the direct current exciting said first winding to measure by the magnitude of the electromotive force the speed of the car, and electroresponsive means receiving energy from said second winding controlled to different conditions according to the magnitude of said electromotive force.

4. In combination, a section of a traffic path traversed by cars, circuit means including a first winding of a transformer and a direct current source and operatively associated with said section to progressively vary the value of the direct current caused to flow in said first winding by said source when a car passes through said section, said current variation being directly proportional to the speed of the car, a second winding provided for said transformer to receive an electromotive force in response to such current variation in said first winding to measure by the magnitude of the electromotive force the speed of the car, and electroresponsive means to receive energy from said second winding controlled to different conditions according to the magnitude of said electromotive force.

5. In combination, a section of a traffic path traversed by cars, a plurality of car detecting devices spaced one at each of a plurality of preselected points along said section, a transformer, circuit means connected to a first winding of said transformer to supply direct current thereto, said circuit means controlled by each of said detecting devices to create a predetermined change in the value of the direct current supplied to said first winding when a car passes a device for progressively changing the value of the direct current at a rate proportional to the speed at which a car traverses said section, a second winding of said transformer to inductively receive an electromotive force in response to such a change in the value of the direct current supplied to said first winding to determine by the magnitude of said electromotive force the speed of the car, and electroresponsive means receiving energy from said second winding controlled to different positions according to the magnitude of said electromotive force.

6. In combination, a section of a traffic path adaptable of being traversed by cars, a plurality of car detecting devices placed one at each of a plurality of preselected points along said section, a transformer, a control circuit including a source of direct voltage connected to a first winding of said transformer to supply direct current of a preselected value to that winding, each of said devices operative to interpose an additional source of direct voltage in said control circuit in response to a car passing the device for increasing the direct current supplied to said first winding at a rate corresponding to the rate at which a car progressively passes the preselected points, said transformer provided with a second winding to receive an electromotive force in response to such increase in the direct current supplied to the first winding to determine by the magnitude of the electromotive force the speed of a car passing through said section, and traffic controlling means connected to said second winding controlled to different conditions according to the magnitude of said electromotive force for providing different control conditions for said car.

7. In combination, a section of a traffic path adaptable of being traversed by cars, said section of a length substantially equal to that of a car, a plurality of car detecting devices placed one at each of a plurality of points spaced at substantially equal intervals along said section, a control circuit including a first winding of a transformer, a plurality of substantially equal voltage direct current sources, each of said detecting devices operable to interpose in the control circuit one of said direct current sources in response to a car passing the point of the device to progressively increase the value of direct current flowing in said control circuit as a car advances through said section, such increase in the value of direct current of the control circuit being at a rate directly proportional to the speed of the car due to said spacing of said detecting devices and the equal voltages of said sources, a second winding for said transformer to receive an electromotive force due to such increase of the direct current of the control circuit, said transformer proportioned for the magnitude of said electromotive force to be directly proportional to the rate of the increase of said direct current, and relay means connected to said second winding energized to different positions according to the magnitude of said electromotive force to provide different control conditions for the car.

8. In combination, a section of a traffic path adaptable of being traversed by cars, said section of a length substantially equal to that of a car, a plurality of car detecting devices placed one at each of a plurality of points spaced at substantially equal intervals along said section, a control circuit including a first winding of a transformer, a plurality of substantially equal voltage direct current sources, each of said detecting devices operable to interpose in the control circuit one of said direct current sources in response to a car passing the point of the device to progressively increase the value of direct current flowing in said control circuit as a car advances through said section, such increase in the value of direct current of the control circuit being at a rate directly proportional to the speed of the car due to said spacing of said detecting devices and the equal voltages of said sources, a second winding for said transformer to receive an electromotive force due to such increase of the direct current of the controlled circuit, said transformer proportioned for the magnitude of said electromotive force to be directly proportional to the rate of the increase of said direct current, relay means connected to said second winding and energized by said direct electromotive force to different combinations according to the magnitude of said electromotive force, and an asymmetric unit interposed in said connection of the relay means to said second winding and poled to prevent energization of the relay means by the electromotive force received by the second winding due to the decrease of current in the controlled circuit due to the rear of a car passing said detecting devices.

9. In combination, a section of a traffic path traversed by cars, said section of a length substantially equal to that of a car, a plurality of car detecting devices placed one at each of a plurality of points spaced at substantially equal intervals along said section and each device having a source of direct current of a given voltage, a control circuit including a first winding of a transformer, each of said detecting devices operable to create a flow of direct current in said control circuit due to the individual current source of the device to cause a progressive change in the value of the direct current flowing in the control circuit as a car advances through said section, such change in the value of the direct current of the control circuit being at a rate directly proportional to the speed of the car due to said spacing of said devices and the equal voltages of the individual current sources of the devices, a second winding for said transformer to receive an electromotive force due to such change in the value of the direct current of the control circuit, said transformer having an unsaturated magnetic core to cause the magnitude of said electromotive force to be directly proportional to the rate at which said direct current of the control circuit is changed, and relay means connected to said second winding energized to different positions according to the magnitude of said electromotive force.

10. In combination, a stretch of a traffic path traversed by cars formed with a plurality of successive sections each of which sections is of a length substantially equal to that of a car, a plurality of car detecting devices for each of said sections one at each of a plurality of substantially equally spaced points along the section, each of said detecting devices having a source of direct current of a given voltage, a control circuit for each section and each such circuit including a first winding of a transformer, each said detecting device operable to create a flow of direct current in the control circuit for the same section due to the individual current source of the device to cause a progressive change in the value of the direct current flowing in that control circuit as a car advances through the respective section, such change in the value of the direct current of a control circuit being of a rate directly proportional to the speed of the car traversing the respective section due to said spacing of the devices and said individual current sources of the devices, a second winding for each of said transformers to receive an electromotive force due to said change in the direct current flowing in the first winding of the respective transformer, each of said transformers having an unsaturated magnetic core to cause the magnitude of the electromotive force of the respective second winding to be directly proportional to the rate at which the direct current of the respective control circuit is changed, and car braking means including relays connected to said second windings and excited by said electromotive forces to different conditions to govern the speed of the car as it traverses said stretch of the traffic path.

11. In combination, a section of a traffic path traversed by cars, means including a transformer located along said section and operable by a car traversing said section to create in a winding of said transformer a direct electromotive force the magnitude of which is directly proportional to the speed of such car, a relay having a predetermined pick-up direct electromotive force, a circuit including a plurality of alternative circuit paths to connect said relay to said transformer winding, each of said circuit paths including a resistor of a value individually preselected for each path, and means to selectively close any one of said circuit paths to preselect the speed at which a car traversing said section causes said relay to be picked up due to the resistor.

12. In combination, a section of a traffic path adaptable of being traversed by cars, means including a transformer located along said section and operable by a car traversing the section to create in a winding of said transformer a direct electromotive force having a magnitude directly proportional to the speed of the car, a first relay having a relatively low pick-up direct electromotive force and a second relay having a relatively high pick-up direct electromotive force, a circuit connection including a plurality of alternative circuit paths to serially connect said relays to said transformer winding, each of said circuit paths including a resistor having a value individually preselected for that circuit path, and means to selectively close any one of said circuit paths to preselect different control speeds with said first relay picked up when a car traversing said section exceeds the selected control speed by a first amount and said second relay picked up when the car exceeds the selected control speed by a second amount.

13. In combination, a section of a traffic path adaptable of being traversed by cars, means including a transformer located along said section and operable by a car traversing said section to create in a winding of said transformer a direct electromotive force the magnitude of which is directly proportional to the speed of such car, a relay having a predetermined pick-up direct electromotive force; a circuit including a plurality of alternative circuit paths, a winding of said relay and another resistor connected to said transformer winding to energize said relay by said direct electromotive force; each of said circuit paths having a resistor of a value individually preselected for each path, means to selectively close any one of said circuit paths to preselect the speed at which a car traversing said section causes said relay to be picked up, and a shunt path controlled by a back contact of said relay to shunt said circuit around said other resistor to cause said relay to release at substantially the same car speed as that at which the relay is picked up.

14. In combination, a stretch of railway track, a plurality of car detecting devices one at each of a plurality of substantially equally spaced points along said stretch, a track circuit including the rails of a preselected portion of said stretch and a track relay, a transformer, circuit means connected to a first winding of said transformer to supply direct current thereto, said circuit means controlled by each of said detecting devices to create a predetermined change in the value of the direct current supplied to said first winding when a car passes the point of a device for progressively varying the direct current at a rate proportional to the speed at which a car traverses said stretch, a second winding for said transformer to receive an electromotive force in response to such variation of the direct current supplied to said first winding, relay means connected to said second winding energized in different arrangements according to the magnitude of said electromotive force, means governed by said relay means to condition said track relay to be governed by a car occupying said portion of the stretch, and signaling means controlled jointly by said track relay and said relay means and selectively conditioned according to the different arrangements of the relay means.

DAVID P. FITZSIMMONS.